United States Patent [19]

de Jager et al.

[11] 4,292,593

[45] Sep. 29, 1981

[54] METHOD OF DEMODULATING A QUADPHASE CODED DATA SIGNAL AND RECEIVER FOR CARRYING OUT THE METHOD

[75] Inventors: Frank de Jager; Rudolf A. Van Doorn; Johannes J. Verboom; Marino G. Carasso, all of Eindhoven, Netherlands

[73] Assignee: U.S. Philips Corporation, New York, N.Y.

[21] Appl. No.: 53,577

[22] Filed: Jun. 29, 1979

[30] Foreign Application Priority Data

Mar. 26, 1979 [NL] Netherlands .................. 7902341

[51] Int. Cl.³ .............................................. H03K 13/01
[52] U.S. Cl. .................................... 329/50; 329/104; 329/122; 375/25; 375/94
[58] Field of Search ............. 329/50, 104, 107, 106, 329/122; 375/94, 25, 26, 34; 340/347 SY, 347 DD

[56] References Cited

U.S. PATENT DOCUMENTS 3,716,780  2/1973  Van Elk et al. .................. 375/34

*Primary Examiner*—Siegfried H. Grimm

*Attorney, Agent, or Firm*—Thomas A. Briody; William J. Streeter; Edward W. Goodman

[57] ABSTRACT

The invention relates to a method of demodulating a quadphase coded data signal and a receiver for carrying out the method. The quadphase code comprises four elementary wave forms, each wave form representing two bits of the original non-coded binary signal. An elementary wave form consists of four half bit intervals, the signal corresponding to the first and the second bit, respectively, being transmitted in the first and the second half bit interval and the signal corresponding to the inverted value of the first and the second bit, respectively, being transmitted in the third and the fourth half bit interval. In a receiver according to the invention such a signal is sampled in each of the four half bit intervals. In principle all information is already available after the sampling operations in the first and the second half bit interval, but by utilizing all four samples a proper protection from noise, interference and zero level shifts is obtained. The receiver determines the difference of the samples taken in the first and the third half bit interval and the difference of the samples taken in the second and the fourth bit interval. A positive difference represents a logic 1, a negative difference a logic 0.

6 Claims, 10 Drawing Figures

METHOD OF DEMODULATING A QUADPHASE CODED DATA SIGNAL AND RECEIVER FOR CARRYING OUT THE METHOD

BACKGROUND OF THE INVENTION

The invention relates to a method of demodulating binary data signals and has for its object to provide a method of demodulating a quadphase coded data signal, this data signal comprising words consisting of first, second, third and fourth equally long, consecutive half bit intervals.

The invention further relates to a receiver for carrying out the method.

Quadphase coding is known from the article by U. Appel and K. Tröndle titled "Zusammenstellung und Gruppierung verschiedener Codes für die Uebertragung digitaler Signale" which was published in the Nachrichten-technische Zeitschrift, Volume 1, 1970, pages 11-16, and FIG. 7 in particular. A quadphase coded signal is obtained by dividing the original binary data signal into groups of two bits, denoted dibits, and by placing the first and the second bits, respectively, of the dibit in the first and the second half bit interval, respectively, of the coded word, consisting of two bit intervals, and by placing the inverted value of the first and the second bit, respectively, of the dibit in the third and fourth half bit interval, respectively, of the coded word.

The coding method owes its name "quadphase" to the property that four basic signals can be distinguished, namely 0011, 1001, 0110 and 1100 (allotted to the dibits 00, 10, 01 and 11, respectively).

SUMMARY OF THE INVENTION

The invention relates to a method of demodulating binary data signals and has for its object, as mentioned in the preamble, to provide a method of demodulating quadphase coded data signals. The method according to the invention is therefore characterized in that a first difference value is determined from a bit and word synchronous comparison of a sample value in the third half bit interval with a sample value in the first half bit interval, in that a second difference value is determined from the bit and word synchronous comparison of a sample value in the fourth half bit interval with a sample value in the second half bit interval and in that the said first and the said second difference values, delayed over half a bit interval, constitute, after having been combined consecutive bit values of a demodulated data word.

The invention further relates to a receiver for carrying out the method and has for its object to provide a simple and reliable receiver for demodulating quadphase coded data signals. The invention is therefore further characterized in that the receiver comprises a delay device and a difference means and, in that an input of the delay device and a first input of the difference means are connected to an input terminal of the receiver and an output of the delay device is connected to a second input of the difference means for determining a difference signal from the data signal and the data signal delayed over a bit interval by the delay device and in that the receiver further comprises a word and bit synchronous clock synchronizing device and a sampling device having control inputs, this sampling device being connected to the difference means and this clock synchronizing device being coupled to the input terminal and to the control inputs of the sampling device for sampling the difference signal in the third and the fourth half bit interval and in that the receiver further comprises means which are connected to the sampling device for interleaving the sampled difference signal to form a data signal which is equidistantly decoded, considered in the time. Such a method and receiver, respectively, are particularly suitable for use in the field of data transmission over physical pairs of wires and the field of magnetic and optical recording. In addition, the method and the receiver, respectively, have a plurality of advantageous aspects.

A first aspect is that a narrow frequency band is required (approximately half the frequency band required for a receiver for biphase coded signals). A second aspect is that an average of one zero-crossing occurs per bit interval T, so that the block regeneration can be simple. A third aspect is that the receiver is less sensitive to interfering frequencies located near the d.c. frequency and the bit frequency, as four samples are taken which are compared two by two. In addition, the quadphase coded signals have the property that they are binary, so that when this coding is used for magnetic recording it is possible to write into magnetic saturation, so that erasing before writing is not required. A further advantageous property of a quadphase coded signal is that it does not comprise a d.c. component, so that d.c. restoration in the quadphase receiver can usually be avoided.

A first embodiment of a quadphase receiver according to the invention is therefore characterized in that the delay device comprises a first and a second sample-and-hold circuit, each having a control terminal, and the difference means comprise a first and a second difference circuit and in that a first input of the first difference circuit and a first input of the second difference circuit are connected to the first input of the difference means and in that the first and the second sample-and-hold circuits are connected to the input of the delay device and the output of the first sample-and-hold circuit is connected to a second input of the first difference circuit, this input constituting the second input of the difference means, and in that the output of the second sample-and-hold circuit is connected to a second input of the second difference circuit and in that the control terminal of the first and the second sample-and-hold circuit is connected to the clock regeneration device for sampling the quadphase coded data signal in the first and the second half bit interval, respectively.

A second embodiment of a quadphase receiver according to the invention is characterized in that the delay device comprises a delay element and the difference means comprises a differential amplifier and in that an input of the delay element comprises the input of the delay device and an output of the delay element constitutes the output of the delay device and in that a non-inverting input of the differential amplifier constitutes the first input of the difference element and an inverting input of the differential amplifier constitutes the second input of the difference means. This embodiment has the advantage that it comprises only one delay element, for example a delay line formed by a coil, and one differential amplifier and that sampling of the signal in the first bit interval is not necessary.

DESCRIPTION OF THE DRAWINGS

The invention and its advantages will be further explained with reference to some Figures, wherein corresponding elements are give the same reference symbols. Herein:

FIG. 9b shows a signal form occurring at the clock synchronizing device shown in FIG. 9a.

DESCRIPTION OF THE PREFERRED EMBODIMENTS

In data transmission systems, the digital information is usually translated at the transmitter end into signals which are more suitable for transmission over the transmission channel. The translation can be effected by means of modulation, coding or by filtering or by a combination of these methods. The receiver performs an inverse translation, causing the informatin to be converted into the original form.

Figure 1:
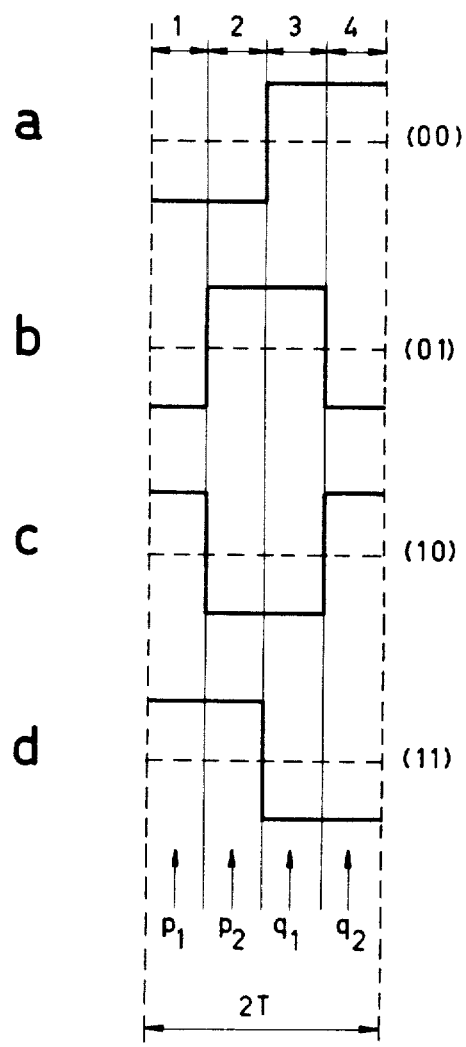
FIG. 1 shows the four elementary signal forms of a quadphase coded signal.

A binary code which is particularly suitable for this purpose is the quadphase code (FIG. 1). The coding rules for quadphase coding are as follows. The data bits of the binary information in the original form are divided into two-bit words, denoted dibits. A quadphase coded word consists of two equally long bit intervals, each divided into half bit intervals. The dibit is transmitted in the first and second half bit intervals 1 and 2, respectively, of the coded word. The inverted value of the dibit is transmitted in the third and the fourth half bit intervals 3 and 4, respectively, of the coded word. FIG. 1 shows the four possible elementary signals of a quadphase signal, wherein by way of example a logic "one" is represented by a positive signal level and a logic "zero" by a negative signal level. Thus, quadphase coding the dibit 00 furnishes 0011 (FIG. 1a), 01 furnishes 0110 (FIG. 1b), 10 furnishes 1001 (FIG. 1c) and 11 furnishes 1100 (FIG. 1d). This coding method owes its name to the property that four elementary signal shapes can be distinguished in a quadphase coded signal. (In the article by U. Appel and K. Tröndle: "Zusammenstellung and Gruppierung verschiedener Codes für die Uebertragung digitaler Signale", Nachrichten-technische Zeitschrift, Volume 1, 1970, pages 11–16 this code is denominated binary clock code). The quadphase code words 0011, 0110, 1001 and 1100 are only four of the sixteen possible code words which can be formed with four bits. Consequently, the quadphase code has a high redundancy. This high redundancy is advantageously used in the clock synchronization.

Figure 2:
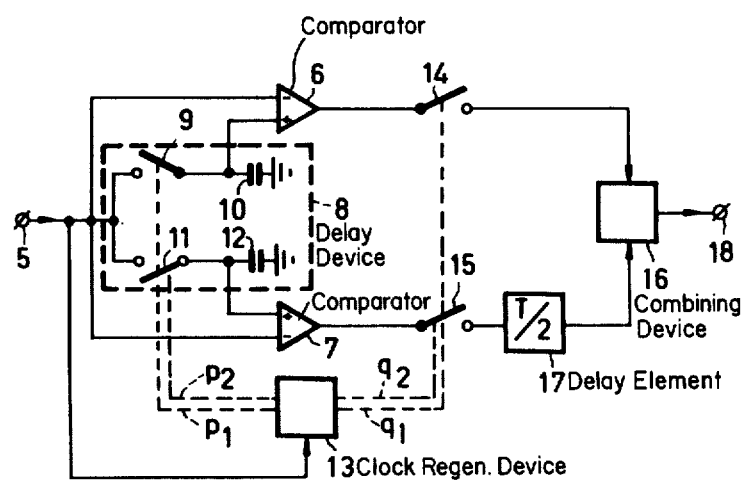
FIG. 2 shows a first embodiment of a quadphase receiver according to the invention.

FIG. 2 shows a first embodiment of a quadphase receiver. A quadphase coded signal is applied to an input terminal 5 of the quadphase receiver. The input terminal 5 is connected to an inverting input each of a first and a second comparator 6 and 7, respectively, and to an input of a delay device 8. The delay device 8 comprises a first sample-and-hold circuit from which a first single-pole switch 9 and a first capacitor 10 form part and further comprises a second sample-and-hold circuit with which a second single-pole switch 11 and a second capacitor 12 are associated. A control input of the first and the second switch 9 and 11, respectively, is coupled to a clock synchronizing device 13 (schematically shown in FIG. 2 by means of a dotted line). The clock regeneration device 13, still to be described, is connected to the input terminal for recovering bit and word synchronous clock signals from the received signals. There is applied to the control input of the switch 9 at the instant p1 (as shown in FIG. 1) a sampling pulse which has for its purpose to close this switch 9 for a short period of time (shorter than T/2), so that capacitor 10 gets a charge which is a measure of the value of the signal at the input terminal at the instant p1. Likewise, a sampling pulse is applied to the control inpu tof the switch 11 of the second sample-and-hold circuit at the instant p2 (FIG. 1) for closing this switch 11 in response to which capacitor 12 is charged to a value which is a measure of the value of the signal at the input terminal at the instant p2. The comparator 6 and 7, respectively, determine difference signals from the signal at the input terminal 5 and the voltages to which the capacitors 10 and 12, respectively, are charged, these difference signals being applied to poles of single-pole switches 14 and 15, respectively, which are connected to the outputs of the comparators 6 and 7, respectively. A control input of each the switches 14 and 15 is coupled to the clock regeneration device 13, as schematically shown in FIG. 2 by means of a dotted line. The method explained above can be summarized as follows: the signal is correlated to a delayed version of that signal, without the occurrence of inter-symbol interference. This operation results in a "matched filter" action which inter alia effects an optimum suppression of the interference components relative to the information.

A quadphase coded word comprises the original (non-coded) information in the first and the second half bit interval and the original (non-coded) information in the inverted sense in the third and the fourth half bit interval. Correlated information is, consequently, added together by the determination of the quadphase coded signal at the instants p1 and q1 and at the instants p2 and q2, respectively. This combined information must thereafter be detected at a suitable instant. For that purpose a sampling pulse, which has for its purpose to close this switch 14 for a short period of time (shorter than T/2) in response to which a difference signal at the output of comparator 6 at the instant q1 is applied to the input of a combining device 16, is applied to the control input of switch 14 at instant q1. Likewise, a sampling pulse which has for its purpose to close the switch 15 for a short period of time, in response to which the difference signal at the output of comparator 7 is applied to the combining device 16 via a delay element 17 at the instant q2, is applied to the control input of switch 15 at instant q2 (FIG. 1). Each word of a quadphase coded signal (word repetition frequency 1/2T) is consequently sampled at four predetermined instants. This detection has the advantage that the output signal of the receiver is increased (3 dB) which results in a more reliable receiver. Furthermore, the receiver is now protected to a greater extent from variations of the d.c. level of the received signal. Also interference signals having a frequency equal to or approximately equal to the frequency (1/T) are suppressed to a greater extent by this double detection.

The sampling instants q1 and q2 differ for half a bit interval (T/2). In order to obtain the information bits at equidistant instants, the difference signal, which is sampled by switch 15 at instant q2, of the differential amplifier 7 is delayed for a period of time equal to half a bit interval (T/2). The combining device 16 interleaves the sample attained at instant q1 with the sample attained at instant q2 and delayed for T/2 to supply the decoded original data signal at an output terminal 18. Trigger circuits or electronic switches can alternatively be used instead of the described mechanical switches. The switches 9 and 11 have, for example, been realized by means of IGFET-transistors (BSV81) and the switches 14 and 15 by means of an integrated trigger circuit (SN7474).

It is alternatively possible to use differential amplifiers instead of comparators for the difference circuits 6 and 7. The comparator produces at its output a two-level digital signal which is a measure of the difference of the "analog" signal at the two inputs. With a differential amplifier an analog signal which is a measure of the difference of the "analog" signal at the two inputs is available at the output. When a differential amplifier is used, it is therefore often required to perform an additional processing on the output signal (adapting the voltage level, rectification) in order to make the signal suitable for sampling by means of the switches 14 and 15, respectively, (which are, for example, implemented as trigger circuit).

It is not necessary to take additional measures to discharge the capacitors 10 and 12 of the sample-and-hold circuits, as the value of these capacitors can be chosen so that at consecutive sampling operations the stored quantities of charge are substantially independent of the previously stored charges.

In the above-described embodiment the value of the quadphase coded data signal is determined once in each half bit interval. If the data signal comprises very strong noise components, for example because the band-width of the transmission channel is wide relative to the band-width of the quadphase signal, the reliability of the detection can be increased by filtering the data signal before applying it to the receiver or by integration of the data signal over a half-bit interval.

Such a receiver is particularly suitable for use in the field of data transmission over physical pairs of wires and in the field of magnetic recording. The receiver has a number of advantages. One advantage is that the receiver need only have a low frequency band. Compared with a code which is often used for magnetic recording- biphase coding- approximately half the frequency band is only required. In contrast with a code which is known as the Miller code, quadphase coding produces a signal which does not comprise a d.c. component. So a restoration of the direct current in a quadphase receiver does not occur. In addition, a quadphase signal has a sufficient number of zero-crossings (on an average one per bit interval) so that the clock frequency can be regenerated in a simple manner in a quadphase receiver. An advantage which the quadphase code has in common with all two-level codes is that writing into magnetic saturation is possible when this coding method is used in the field of magnetic recording. Information recorded in the magnetic carrier is overwritten, so that erasing before writing is not necessary. A further advantage is that the power spectrum of a quadphase coded signal has a zero at the bit frequency (1/T), offering the possibility to locate a pilot frequency there. The spectrum of a biphase coded signal has indeed also a zero which, however, occurs, for a certain bandwidth, only at a rate which is twice the bit rate (2/T). Therefore, the cut-off frequency of the biphase system will in many cases be a hindrance to the use of this zero.

Figure 3:
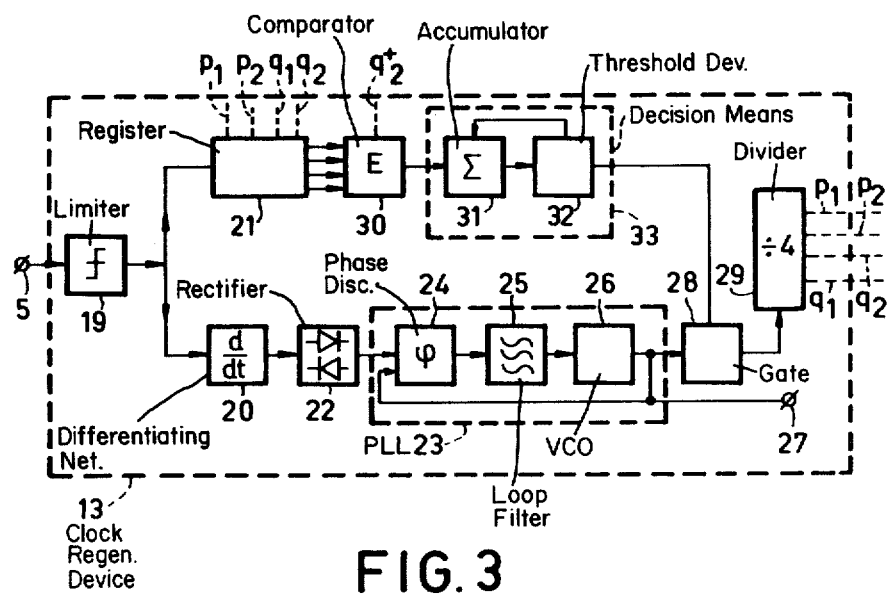
FIG. 3 shows a first embodiment of a clock synchronizing device for use in a quadphase receiver as shown in FIG. 2, as described in our co-pending U.S. application Ser. No. 056,482, filed June 11, 1979.

FIG. 3 shows an embodiment of a clock regeneration device for use in a quadphase receiver, for example a quadphase receiver as shown in FIG. 2. In the clock regeneration device 13 a frequency which is twice the bit rate (2/T) is recovered from the received signal. A quadphase coded data signal comprises transitions which follow one another at a time interval of T/2, 2 T/2, 3 T/2 or 4 T/2. By selecting the rate 2/T therefrom the period of this frequency corresponds to the time interval between two consecutive samples in the receiver (T/2). Samples of a certain type, for example the p1-sample, occur only once per word, consequently with a rate which is four times as long. This frequency can be determined from the frequency 2/T by means of division. This is effected by applying the quadphase signal, received at the output terminal 5, to a limiter 19 to which a differentiating network 20 and a register 21 are connected. The differentiating network 20 generates a pulse at each signal transition. These pulses are applied to a full-wave rectifier 22 for applying a random pulse train, having an (average) clock rate of 2/T, to a phase-locked loop 23. The phase-locked loop (PLL) comprises, in this order, a phase detector 24, a loop filter 25 and a voltage-controlled oscillator 26. The output of the voltage-controlled oscillator 26 is connected to a control input of the phase detector 24. The loop filter 25 applies a voltage which is proportional to the phase difference between the input signal of the phase detector 24 and the control signal of the phase detector 24, to the voltage-controlled oscillator 26, in response to which the phase-locked loop 23 is locked in known manner on the frequency 2/T. This frequency, the clock frequency, becomes available at an output 27 of the PLL 23. The clock rate 2/T is applied to a divider 29 having a division factor 4, via a gate 28. Sampling signals for the switches 9, 11, 14 and 15, each having a rate of 1/2T (half the bit rate) and a phase of 0°, 90°, 180° and 270° are then available at outputs of divider 29. Depending on the phase at which the divider starts, the phase of the sampling signal can differ 0°, 90°, 180° or 270° from the desired values, as it cannot be known with certainty where the divider 29 starts. Furthermore, at the start of the reception it is not known whether the receiver is in synchronism, or whether the synchronization of the receiver has been lost due to interferences in the received signal. In order to eliminate these uncertainties, the clock regeneration device 13 is provided with a monitor or word synchronizing device. This word synchronizing device comprises the register 21 and a comparator device 30. The signal, limited by the limiter 19, is sampled at the sampling instants p1, p2, q1 and q2 and the sampling values Up1, Up2, Uq1 and Uq2, which represent the polarity of the received, quadphase coded signal at the instants p1, p2, q1 and q2, are stored in the register 21. After the instant q2 the sampling values are applied to the comparator device 30 where the logic function $E = \overline{(Up1 \oplus Uq1).(Up2 \oplus Uq2)}$ are performed ($\oplus$ corresponds to modulo-2 addition).

There are four distinct possibilities:

1. $E = 0$. Modulo-2 addition of a signal value to the correlated signal value in the sense described above produces 0, if the word synchronization is correct.

2. $E = 0$. Modulo-2 addition of a signal value to another signal value furnishes accidentally (depending on the coded information) $E = 0$, whereas the synchronization is not correct. If the coded quadphase signal would consist of a sufficiently long sequence of such words, synchronization is absolutely unattainable. This can be prevented by means of known techniques (for example by scrambling).

3. $E = 1$. Although the word synchronization is correct, a polarity of a signal value is incorrectly determined as the result of a transmission error, a disturbance, etc.

4. $E = 1$. The word synchronization is incorrect.

In order to enable a distinction between these four possibilities, the output of the comparison device 30 is connected to an accumulator 31, which forms part of decision means 33. The accumulator 31 adds consecutive values of E ($E_1, E_2 \ldots E_m$) together and this value $$\sum_{i=1}^{n \leq m} E_i$$

is applied to a threshold device 32 which comprises an adjustable threshold. The threshold level of this threshold is chosen so high that, when the synchronization is correct, the threshold value is not exceeded at the transmission quality (noise, cross-talk) then prevailing. It was ascertained that a threshold value corresponding to 0.4 m is very satisfactory in practice. If the signal applied to the threshold device 32 exceeds the threshold value, a signal is applied to a control input of the gate 28 in response to which the signal coming from the phase-locked loop is suppressed once for half a period (T/2) and the phase of each of the output signals of divider 29 is shifted 90°. Exceeding the threshold value also causes a signal to be generated by means of which the accumulator 31 is reset to 0. Accumulator 31 is constructed as a modulo-m counter, so that it is reset after m consecutive values of E. For the case in which there is a phase shift of 270° between the phase of each of the actual sampling pulses produced by the divider 29 and the desired value, the actual synchronization is generally equal to the desired synchronization of the three word sequences. In practice m = 16 appeared to be an advantageous value. This clock regeneration device 13 has the advantage that a distinction is made in a reliable manner between transmission errors in response to, for example, noise and between incorrect synchronizaton. A further advantage is that, when the statistical properties of the received quadphase coded signal are changed by noise or interference (error probability smaller or greater) the clock regeneration device 13 is adapted in a simple manner by a correspondingly different adjustment of the threshold value and the length of the sequence m.

The sampling values generated in the receiver for the demodulation of the quadphase coded signal have been obtained in a different manner than the sampling values for the word synchronization. It is therefore conceivable that, although the word synchronization device erroneously detects an incorrect synchronization the signal demodulated by the receiver is correct. As this occurs only incidentally, the word synchronization device is protected therefrom by the threshold device.

Figure 4:
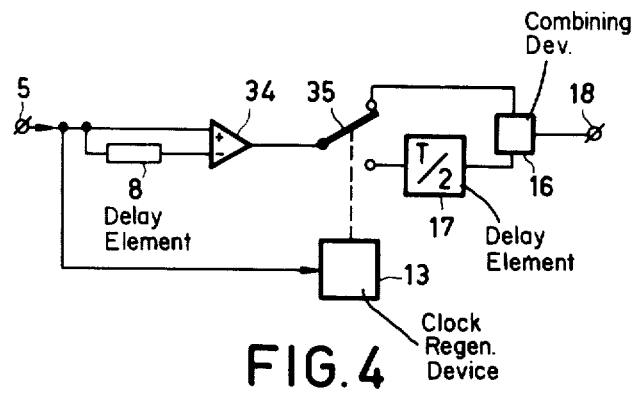
FIG. 4 shows a second embodiment of a quadphase receiver according to the invention.

FIG. 4 shows a second embodiment of a quadphase receiver. In the above-described first embodiment the sampling values are first processed in parallel at the instants p1 and q1, p2 and q2, respectively, and thereafter interleaved to form one equidistant sequential signal. The first embodiment may be considered as being a space-division system. In the second embodiment the sampling values are first processed in series, then separated from one another and thereafter interleaved to form one equidistant and sequential signal. The second embodiment may be considered as being a time-division system.

The quadphase coded signal which is applied in the second embodiment to the input terminal 5 is applied directly and via a delay device 8 to a differential amplifier 34. The time delay of the delay device 8 is equal to one bit interval (T). The delay device 8 may either be constructed as an analog (for example Charge Transfer Devices of Sample-and-Holds) or as a digital shift register or as a delay line. The difference signal of the coded quadphase signal and the quadphase signal which has been delayed over one bit interval are applied to a pole of a single-pole change-over switch 35. A control input of change-over switch 35 is coupled to the clock regeneration device 13, as shown schematically in FIG. 4 by means of a dotted line. The clock regeneration device 13 is connected to the input terminal 5 for recovering bit and word synchronous clock signals from the received signal. At the instant q1 (as shown in FIG. 1) a sampling pulse, which adjusts the switch 35 for a short period of time (in any case shorter than T/2) to the first position, shown in the drawing, in response to which the difference signal at the output of the differential amplifier 34 is applied to the combining device 16 at the instant q1, is applied to the control input of the change-over switch 35. Likewise, the control input of the change-over switch 35 is adjusted for a short period of time to the second position, not shown, at the instant q2 (FIG. 1), in response to which the difference signal is applied to the combining device 16 via the delay element 17 at the instant q2. The interleaved decoded, original data signal is applied to the output terminal 18 in the manner already shown for FIG. 2, at equidistant instants. The second embodiment differs from the first embodiment in some further respects, a first difference being that the delay device 8 in the second embodiment can be realized in a simple manner for a receiver for bit frequencies above approximately 200 kHz: one single delay element (coil) is sufficient. In contrast therewith the receiver for the first embodiment is more suitable for lower frequencies, but can only be used up to some MHz. A further difference is that the second embodiment requires only one differential amplifier 34, as the differential amplifier 34 is used to supply a difference signal at instant q1 as well as at instant q2.

Figure 5:
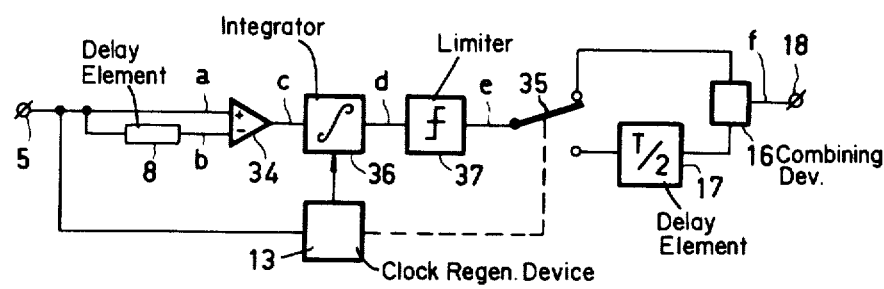
FIG. 5 shows a modified second embodiment of a quadphase receiver according to the invention.
Figure 6:
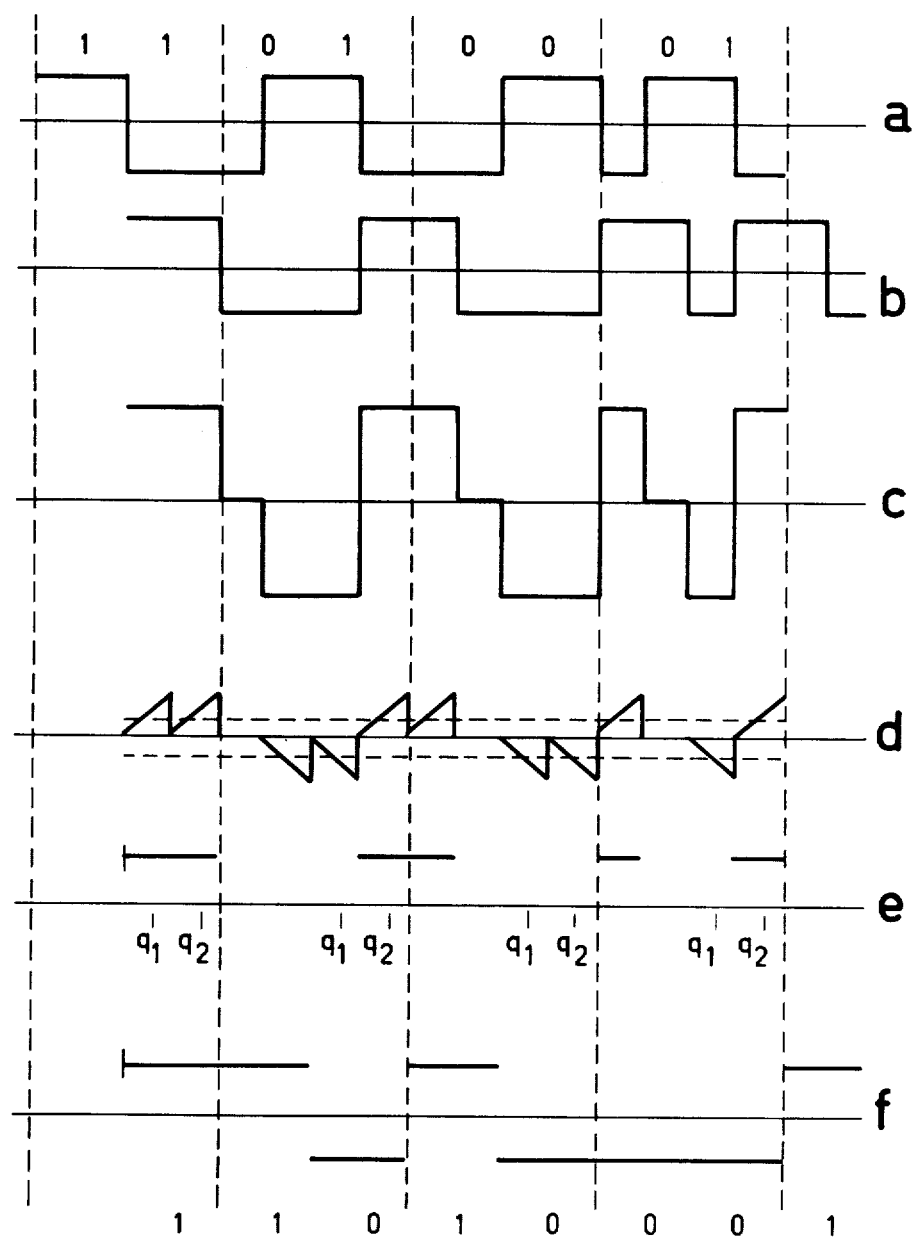
FIG. 6 shows some signal forms occurring at the quadphase receiver shown in FIG. 5.

If the quadphase coded signal applied to input terminal 5 is disturbed to a great extent, for example by noise, the detection of the signal is improved in accordance with a modified embodiment of FIG. 4 by integrating the output signal of the differential amplifier 34, as shown in FIG. 5. FIG. 6 shows some idealized signal forms occurring in the modified embodiment of FIG. 5. The input signal (a, FIG. 6) and the input signal which was delayed for one bit interval (b, FIG. 6) are applied to the differential amplifier 34. The output signal of the differential amplifier 34 (c, FIG. 6) is applied to an integrator 36, which is connected to the clock generator 13. At the beginning of each half bit interval the integrator 36 is reset to zero and therefore produces a signal denoted by d. This signal is applied to the pole of change-over switch 35 via a limiter 37. The output signal of limiter 37, signal e, is converted into the original, non-coded signal (f, FIG. 6) in the manner described for FIG. 2.

Figure 7:
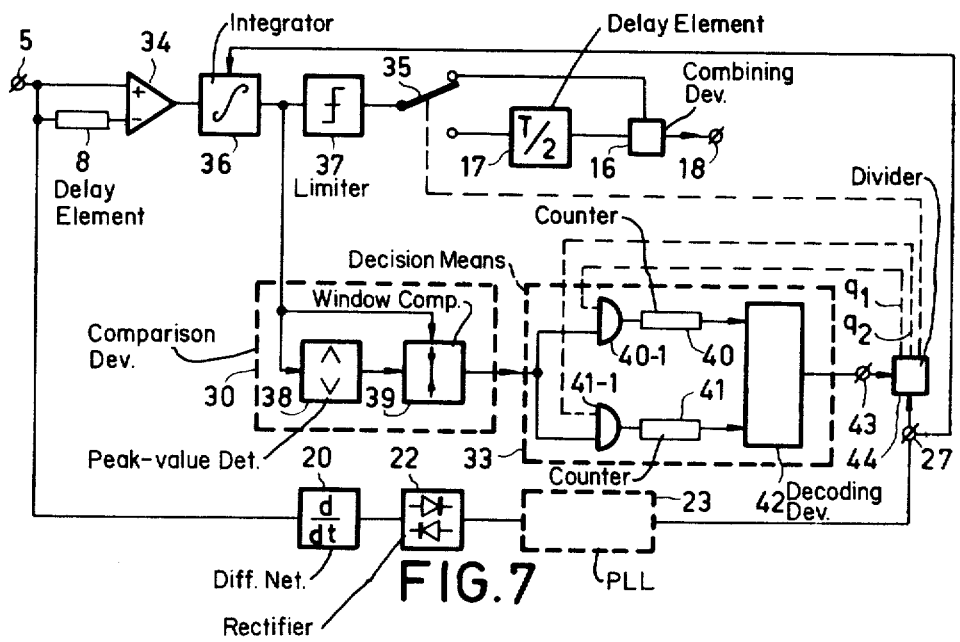
FIG. 7 shows a second embodiment of a clock synchronizing device for use in a quadphase receiver as shown in FIG. 5 and described in our co-pending U.S. application Ser. No. 056,482, filed June 11, 1979.

As mentioned above the first embodiment of a clock synchronization device has the drawback that, in the worst case, the word synchronization does not have the correct value until after three cycles. A clock synchronization device which obviates this drawback is shown in FIG. 7. This FIG. 7 also shows the receiver in accordance with FIG. 5.

The bit synchronization device comprises, in this order, the differentiating network 20, the biphase rectifier 22, the phase-locked loop 23 and a divider 44. The bit synchronization device operates in the manner described for FIG. 3. The word synchronization device comprises a comparison device 30, an output of which is connected to the decision means 33. The comparison device 30 is connected to the output of the integrator 36. This has the advantage that the integrated difference between the data signal and the data signal delayed for one bit interval T is available at that output, so that a store for the word synchronization device is not required. (In the present, second embodiment the function of register 21 of FIG. 3 is performed by the delay device 8). The comparison device 30 comprises a peak-value detector 38 which has one input connected to the output of integrator 36. The peak-value detector determines in known manner the instantaneous peak value of the input signal. The output of peak-value detector 38 is connected to the input of the window comparator 39. A control input of the window comparator 39 is connected to the output of integrator 36. The window comparator determines whether the input signal is located within a minimum and maximum value, derived from the control signal and, should this not be the case, produces a pulse at the output. Such a window comparator is known from: "Operational Amplifiers, Design and Application", by Tobey, Craeme and Huelsman, published by McGraw Hill, New York, page 365 in particular. The output of the window comparator 39 is connected to the input of the decision means 33. The decision means 33 comprise a series arrangement of a first AND-gate 40-1 and a first counter 40 and a series arrangement of a second AND-gate 41-1 and a second counter 41. A first input of these two AND-gates is connected to the input of the decision means 33. A second input of the first AND-gate 40-1 is connected to the divider 44 for setting this second input at the instant q1 and a second input of the second AND-gate 41-1 is connected to the divider 44 for setting this second input at the instant q2. If the first input of the first AND-gate 40-1 is also set at instant q1 by a pulse supplied by the window comparator 39, the counting position of counter 40 is increased by one via the AND-gate 40-1.

Likewise, if the first input of the second AND-gate 41-1 is set by a pulse at instant q2, the counting value of the second counter 41 is increased by one. This cycle is performed for a total of n times, that is to say at the instants q1 and q2, respectively, it is determined for a sequence of n consecutive data words how many times the window comparator 39 has been energized. The following cases are possible. When the synchronization is correct, the output signal of the integrator 36 (d, FIG. 6) has a value unequal to zero at all instants q1 and q2. The window comparator 39 does not produce an output signal and the counting positions of the counters 40 and 41 are therefore not increased, both counters 40 and 41 still being in the O-position at the end of the sequence. In the three other possible cases, namely in which the actual synchronization is shifted ¼, ½ or ¾ dibit relative to the correct synchronization, the counting position of at least one of the counters 40, 41 will be increased. Thus, for a word synchronization shifted for ¼ dibit, that is to say at instant q2 in the original signal the actual signal is sampled as if it were q1 (d, FIG. 6), then a signal which is unequal to zero will be available at the output of integrator 36 at all these instants. However, at the instant q2 a signal having a value zero will be sampled in, on an average, half of the cases. This implies that the counter 40 has the value zero at the end of the sequence of n samples and counter 41 has a value unequal to zero. For the case the word synchronization is shifted for ¾ dibit (or −¼ dibit) the complementary case occurs: counter 41 has a value zero at the end of the sequence and counter 40 a value unequal to zero. When the synchronization is shifted for half a dibit, the counting positions of both counters 40 and 41 are increased to the same extent.

The first and the second embodiments differ in one further respect. In the first embodiment a period of the output signal of the voltage-controlled oscillator 26 is suppressed (by means of gate 28), when absence of synchronization is detected, which implies that one bit information is sacrificed in the receiver ("skipped"). In the worst case 3 bits can be lost in this manner. In the secone embodiment the correction is effected directly and in the forward or the reverse direction, so that, on an average, no bits will be sacrificed or added.

Due to transmission errors, noise, etc., the counters 40 and 41 will generally have a final position which is unequal to zero at the end of the sequence of n words, also when the synchronization is correct.

In a corresponding manner as for the embodiment shown in FIG. 3, the embodiment shown in FIG. 7 has the advantage that the final value of the counters 40,41 which is considered to be "zero" is chosen so high that it cannot be exceeded at the prevailing transmission quality. For that purpose outputs of the counters 40 and 41 are connected to a decoding device 42 which forms part of the decision means 33. Decoding device 42 selects the counter final positions and codes them as $T_1T_2=00$, 01, 10 or 11, "0" representing a value below a threshold value and "1" a value above the threshold value. A correction signal, corresponding to one of the four possible combinations of counter final positions, is applied to the control input 43 of the divider 44, in response to which the divider 44 is set to the correction phase.

Using a quadphase receiver for the reception of data blocks creates a special problem. The information of the data block is of such a nature that no loss of information due to incorrect synchronization can be tolerated. To prevent this, the data blocks are preceded by a synchronization signal. The synchronization signal is known to the receiver so that it can be ascertained in a simple manner whether the word synchronization of the receiver is correct.

Figure 8:
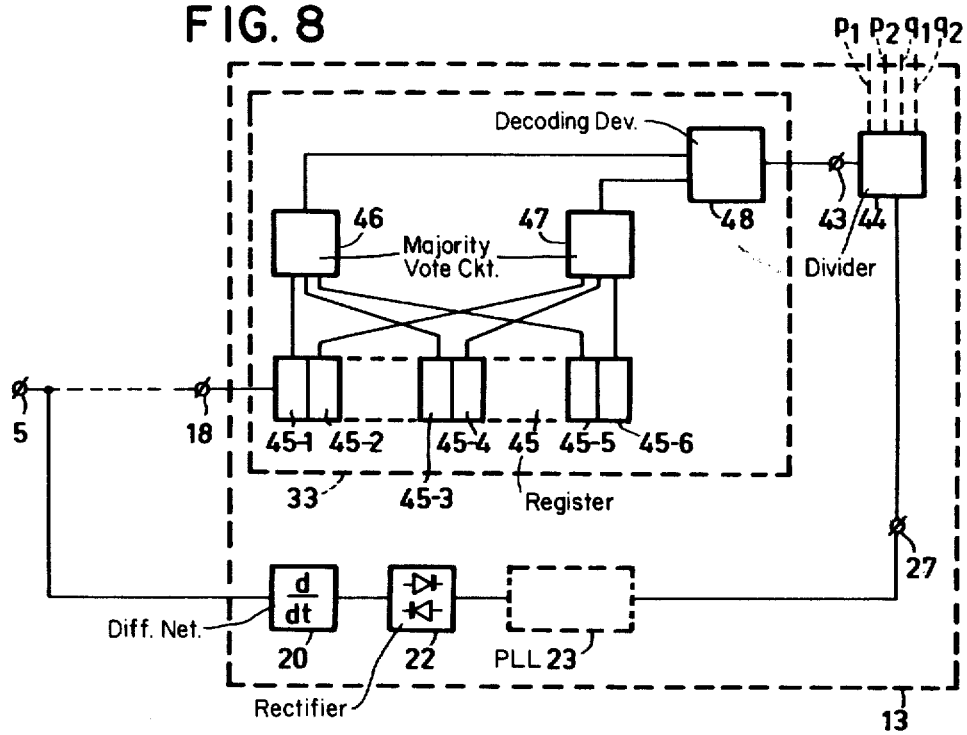
FIG. 8 shows a third embodiment of a clock synchronizing device for use in a clock phase receiver as shown in FIG. 2, 4 or 5, as described in our co-pending U.S. application Ser. No. 056,482, field June 11, 1979.

FIG. 8 shows an embodiment of a clock synchronizing device 13 which is extremely suitable for that purpose.

A bit synchronizing device which comprises, in this order, the differentiating network 20, the full-wave rectififer 22, the phase-locked loop 23 and the divider 44, is connected to the input terminal 5 of the receiver. The bit synchronizing device operates in a manner described for FIG. 4. The first and the second embodiment of the clock regeneration device 13 include a comparison device (30) for comparing the sampling values with one another. In the present third embodiment the receiver itself is utilized for that purpose. Herein the decision means are connected to the output terminal 18 of the quadphase receiver. The decision means 33 comprise a register 45 an input of which is connected to the input of the decision means 33. The register comprises 2n (n=3, 4, 5, . . . ) elements, inter alia 45-1 to 45-6, inclusive. An arbitrary, even, number of elements may have been disposed between the elements 45-2 and 45-3 and between 45-4 and 45-5. The register 45 is suitable for storing n words of the synchronizing signal. The elements which correspond to at least three words are provided with an output. In FIG. 8 the elements in which the first symbol of a synchronization word is stored (45-1, 45-3, 45-5) are connected to a first majority vote circuit 46 and the outputs of the elements in which the second symbol of a synchronization word is stored (45-2, 45-4, 45-6) are connected to a second majority vote circuit 47. After the register 45 has received the synchronization signal which was decoded by the receiver, the majority vote circuits 46 and 47, respectively, investigate which symbols stored in the elements 45-1, 45-3, 45-5 and 45-2, 45-2, 45-6, respectively, is in the majority. The symbols which are in the majority are respectively applied by the majority vote circuits 46 and 47 to the decoding device 48, which applies a correct signal corresponding therewith to the control device 43 of the divider 44. This achieves that at the end of the synchronization signal, the correct word synchronization has been obtained or is obtained.

It is, however, not necessary to use majority vote circuits in all circumstances. If the quadphase coded signal applied to the receiver is of such a high quality (little noise etc.) that errors in the transmission or in the reception are substantially impossible, the detected signal which is available at the output 18 of the receiver can be applied directly to the decoding device 48.

Figure 9A:
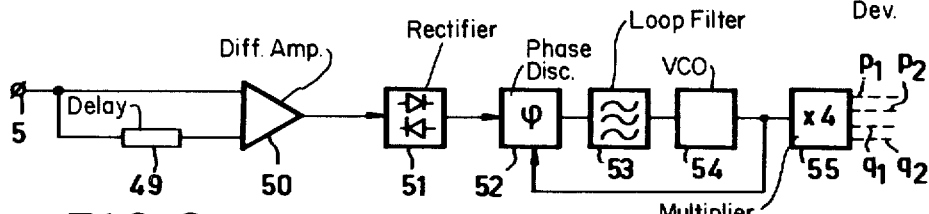
FIG. 9a shows a fourth embodiment of a clock synchronizing device for use in a quadphase receiver as shown in FIG. 2, 4 or 5, as described in our co-pending U.S. application Ser. No. 056,482, field June 11, 1979.
Figure 9B:
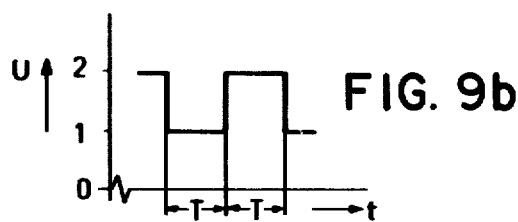

FIG. 9a shows a fourth embodiment of a clock synchronization device. The quadphase coded data signal applied to input terminal 5 is applied directly and via a delay device 49 to inputs of a differential amplifier 50. The time delay of the delay device 49 is equal to one bit interval (T). The output signal of the differential amplifier 50 is applied to the full-wave rectifier 51. The clock synchronization device is based on the following recognition. If the two-level quadphase coded signal is represented as a signal having a positive value (for example the value 1) and as a signal having a negative value (for example the value −1) then the output signal of differential amplifier 50 has a value +2 at scanning instants which are bit and word synchronous and, depending on the information, a signal value +2, 0 or −2 at the remaining sampling instants. After full-wave rectification in device 51 the signals at the first-mentioned instants have an average value of +2 (neglecting transmission errors etc. it has continuously a value +2) and at the last-mentioned instants an average value +1 (the mean value of +2, 0, 0, −2 for an assumed random distribution of positive and negative signal values). FIG. 9b shows such an average signal form, from which the rate 1/2T can be selected with an unambiguous phase by means of a phase-locked loop consisting of a phase comparator 52, a loop filter 53 and a voltage-controlled oscillator 54. A signal having this rate (word rate) is applied to a device 55 which multiplies this rate to four and which makes four sampling pulses for each word interval available at the output.

When the fourth embodiment of the clock synchronization device is used for a quadphase receiver shown in FIG. 4 or FIG. 5, the delay device 49 and differential amplifier 50 can be replaced by the corresponding circuit formed by delay device 8 and differential amplifier 34, this circuit forming part of the receiver. In that case the input of the full-wave rectifier 51 is connected to the output of differential amplifier 34 of the receiver shown in FIG. 4 or FIG. 5.

What is claimed is:

1. A method of demodulating a quadphase coded data signal which comprises data words consisting of first, second, third and fourth equally long, consecutive half-bit intervals, said method comprising the steps of:
   sampling said data words in each of said half-bit intervals forming separate sampling values;
   synchronously comparing, bit and word, the sampling value in the third half-bit interval with the sampling value in the first half-bit interval forming a first difference value;
   synchronously comparing, bit and word, the sampling value in the fourth half-bit interval with the sampling value in the second half-bit interval forming a second difference value;
   delaying said second difference value for a half-bit interval such that said second difference value follows said first difference value by one bit interval; and
   combining said first difference value with said second difference value to form a demodulated data word.

2. A receiver for demodulating a quadphase coded data signal, which data signal comprises data words consisting of first, second, third and fourth equally long, consecutive half-bit intervals, said receiver comprising an input; delay means having input means and output means, said input means being coupled to said receiver input; difference means having first and second input means and output means, said first input means being coupled to said receiver input and said second input means being coupled to said output means of said delay means, wherein said difference means forms difference signals from the data signal and the data signal delayed for one bit interval by the delay means; sampling means coupled to the output means of said difference means and having control input means; a word and bit synchronous clock regeneration device coupled to said receiver input for regenerating clock signals from said data signal and for selectively applying said clock signals to said control input means of said sampling means wherein said difference signals are sampled in the third and fourth half-bit intervals; and means coupled to said sampling means for interleaving the sampled difference signals to form an equidistant decoded data signal.

3. A receiver as claimed in claim 2, characterized in that the delay means comprises a first and a second sample-and-hold circuit, each comprising a control terminal, and the difference means comprises a first and a second difference circuit and in that a first input of the first difference circuit and a first input of the second difference circuit are connected to the first input means of the difference means and in that the first and the second sample-and-hold circuits are connected to the input means of the delay means and the output of the first sample-and-hold circuit is connected to a second input of the first difference circuit, this input forming the second input of the difference means and in that the output of the second sample-and-hold circuit is connected to a second input of the second difference circuit and in that the control terminal of the first and of the second sample-and-hold circuit is connected to the clock regeneration device for sampling the quadphase coded data signal in the first and in the second half bit interval, respectively.

4. A receiver as claimed in claim 2, characterized in that the delay means comprises a delay element and the difference means comprises a differential amplifier and in that an input of the delay element constitutes the input means of the delay means and an output of the delay element constitutes the output means of the delay means and in that a non-inverting input of the differential amplifier constitutes the first input means of the difference means and an inverting input of the differential amplifier constitutes the second input means of the difference means.

5. A receiver as claimed in one of the claims 3 or 4, characterized in that a first output of the sampling means is connected to a delay element having a time delay of half a bit interval and in that a second output of the sampling device is connected to a first input of a combining device and in that a second input of the combining device is connected to an output of the delay element for interleaving the sampled difference signal to form an equidistant decoded data signal.

6. A receiver as claimed in claim 3, characterized in that the sample-and-hold circuits each comprise a single-pole switch and a capacitor and in that the switch is connected between the input of the delay means and the control terminal and in that the capacitor is connected between the control terminal and ground.

* * * * *